United States Patent [19]

Friswell

[11] Patent Number: 5,737,871
[45] Date of Patent: Apr. 14, 1998

[54] METHOD OF PREPARING AND UTILIZING PETROLEUM FUEL MARKERS

[75] Inventor: Michael R. Friswell, Wayne, N.J.

[73] Assignee: Morton International, Inc., Chicago, Ill.

[21] Appl. No.: 771,809

[22] Filed: Dec. 23, 1996

Related U.S. Application Data

[63] Continuation-in-part of Ser. No. 638,409, Apr. 26, 1996, abandoned.

[51] Int. Cl.$^6$ .................................................. C10L 1/22
[52] U.S. Cl. ........................ 44/328; 534/595; 534/831; 534/852; 534/856; 534/858
[58] Field of Search ............................ 44/328; 534/858, 534/561, 573, 595, 829, 832, 852, 856, 831

[56] References Cited

U.S. PATENT DOCUMENTS

| | | | |
|---|---|---|---|
| 2,689,171 | 9/1954 | Hager et al. | 44/328 |
| 2,850,493 | 9/1958 | Seruto | 44/328 |
| 3,534,016 | 10/1970 | Lange | 44/328 |
| 3,734,857 | 5/1973 | Moiso et al. | 44/328 |
| 4,479,899 | 10/1984 | Hamprecht | 44/328 |
| 4,904,765 | 2/1990 | Derber et al. | |
| 5,266,227 | 11/1993 | Reichelt et al. | 44/328 |
| 5,428,137 | 6/1995 | Otsuka et al. | 44/328 |
| 5,487,770 | 1/1996 | Dyllick-Brenzinger et al. | 44/328 |
| 5,490,872 | 2/1996 | Friswell et al. | |

FOREIGN PATENT DOCUMENTS 0959719  4/1964  United Kingdom.

*Primary Examiner*—Margaret Medley
*Attorney, Agent, or Firm*—Wayne E. Nacker; Gerald K. White

[57] ABSTRACT

Compounds known as "solid dispersed dyes" are synthesized in a two-phase system from which they disproportionate into a water-immiscible solvent phase, providing marker solutions. Marker solution is added to a petroleum fuel to introduce the compound thereto in dissolved form. Subsequently, extraction of the compound with acidic aqueous solution produces a chromophoric reaction which indicates presence of the compound in the petroleum fuel.

6 Claims, No Drawings

METHOD OF PREPARING AND UTILIZING PETROLEUM FUEL MARKERS

This is a continuation in part of copending application Ser. No. 08/638,409 filed on Apr. 26, 1996, now abandoned.

The present invention is directed to preparing solutions of dyes suitable for tagging petroleum fuels.

BACKGROUND OF THE INVENTION

It is known to tag petroleum products for purpose of identification, e.g., for source, tax considerations. Examples of petroleum product tagging are found, for example, in U.S. Pat. Nos. 4,209,302, 4,735,631, 4,764,474, 5,205,840, 5,252,106, and 5,490,872, the teachings of each of which are incorporated herein by reference. In view of the many sources and grades of petroleum fuels and many tax classifications, there remains a need for additional chemical markers for tagging petroleum fuels.

SUMMARY OF THE INVENTION

In accordance with the present invention, dyes which constitute part of a class known as "solid disperse dyes", heretofore used, for example, in textile dyeing, are synthesized in a two-phase system, including an acidic aqueous phase and a solvent phase; whereby the dyes disproportionate to the solvent phase. Concentrated solutions of the dyes are thereby obtained, and these concentrated dye solutions are miscible with petroleum fuels, enabling the dyes to be introduced as markers into the petroleum fuels. The dyes are used as markers to tag petroleum products at levels of from about 0.25 to about 100 ppm (parts per million by weight). The marker is extracted from the tagged petroleum product with acidic aqueous solution, whereupon the tag undergoes a chromophoric reaction, developing a strong color in the aqueous extraction solution.

DETAILED DESCRIPTION OF CERTAIN PREFERRED EMBODIMENTS

The dyes of the present invention have the general formula:

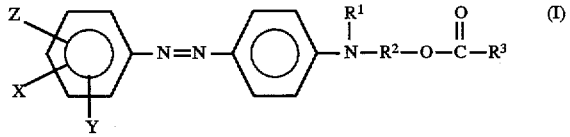

where $R^1$ is $C_1$–$C_3$-alkyl, $R^2$ is $C_1$–$C_3$-alkylene, and $R^3$ is $C_1$–$C_2$-alkyl, preferably $C_1$-alkyl, X and Y are the same or different and are selected from H, methyl, ethyl, methoxy, halogen, and nitro, and Z is H or

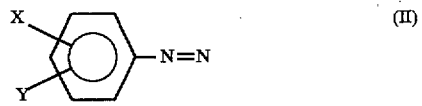

wherein X and Y are as defined above.

Heretofore, compounds of the above formula were synthesized in alkaline aqueous solution, from which the dyes precipitated. The precipitate, was subsequently dispersed as solid particulates and used for dyeing textiles. In solid form, these compounds are very difficult to dissolve either in common organic solvents or directly into petroleum fuels.

In accordance with the present invention, the compounds of the above-formula are synthesized in a mixed, two-phase system in which the compounds disproportionate from an acidic aqueous phase into a solvent phase. Optimal coupling occurs with the aqueous phase at a pH between about 3 and about 4. The solvent phase can be subsequently reduced to provide solutions of the compounds in the range of 40–60% solids. Such solutions are miscible with petroleum products, such as petroleum fuels, and are useful for solubilizing the compounds in petroleum fuels.

The solvent phase may be an aromatic solvent, such as toluene, a high-flash aromatic solvent mixture, such as that sold as Aromatic® 200, sec butyl phenol, 2–6-di-secondary butyl phenol, heptyl,octyl-β-naphthol, and mixtures thereof. Preferred solvents and solvent mixtures for the solvent phase may vary, depending upon the marker compound synthesized.

The reaction sequence is generally as follows. A compound of the formula (in which $R^1$ and $R^2$ are as defined above):

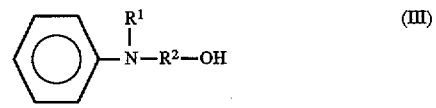

is esterified with an anhydride or chloride of an acid having the formula $R^3COOH$ (in which $R^3$ is as defined above) to produce a compound of the formula:

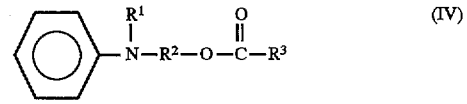

Then aniline or an aniline derivative of the formula (in which Y and Z are as defined above):

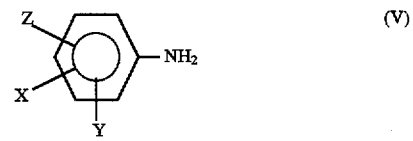

is diazotized and coupled with the ester to produce the compounds of the present invention. Typically, the volume of the solvent phase to the volume of the aqueous phase ranges from about 2:1 to about 4:1 although this may vary. The two-phase system is agitated during the coupling reaction to provide substantial contact between the phases so as to ensure that the compound that is produced becomes dissolved in the solvent phase, rather than precipitating.

If the particular aniline derivative is weakly basic, coupling may have to be performed at a very low pH. In such case, it is usually necessary to partially neutralize, e.g., to a pH of between about 4 to about 7 or even to slightly basic, for the coupled compound to be taken up in the solvent phase.

For tagging purposes, the compounds are typically added at between about 0.25 and about 100 ppm (parts per million by weight), most typically between about 1 and about 5 ppm. At such low levels, the/compounds, though colored, impart relatively little color to the petroleum fuel. Alternatively, any color the marker may impart to the petroleum fuel may be masked by the color of a petroleum fuel dye, such that it is not readily apparent that the petroleum fuel is tagged. If used with a dye, the dye is selected such that it is not extractable from the petroleum fuel with acidic aqueous solution. While compounds used in the method of the invention may be detected at levels as low as about 0.25 ppm, higher levels of marker may be used so that the marker can be detected even when the tagged fuel is admixed with non-tagged fuels.

To identify a tagged fuel, a sample of the fuel is extracted with a strongly acidic solution of an acid, such as HCl, phosphoric acid, formic acid, acetic acid and propionic acid. pH of the extracting solution is generally about 3.0 or below. The strength of the acid and extraction pH will vary, however, with the individual marker used. During extraction, the marker undergoes a chromophoric reaction with the acid, producing a different and a stronger color then the marker had in its non-protiated state within the petroleum fuel. Typically, the volume of the acidic, aqueous extractant solution to the volume of fuel ranges from about 0.5:1 to about 10:1, but this may vary depending upon the amount of marker in the petroleum fuel and the color intensity of the extracted compound. The color of the extracted marker will vary, depending on the substituent groups.

The color which is developed in the acidic aqueous solution is visible to the naked eye at the concentrations at which the marker compound is added to the petroleum fuel and at the relative volumes of extractant solution to petroleum fuel suggested above, thereby providing a very simple qualitative test for presence of the marker. However, with use of appropriate chromatographic equipment, a relatively quantitative determination of the amount of marker present in the petroleum fuel may be made. Thus, it can be further determined if a tagged petroleum fuel has been adulterated with non-tagged petroleum fuel.

Compounds similar to the extractable markers of the present invention have been described previously, for example, in U.S. Pat. No. 3,534,016 to Lange. However, in the Lange patent, the esterifying acids, when used, have 7 to 12 carbons; i.e., in terms of the formulae set forth above, $R^3$ is $C_6$–$C_{11}$ as opposed to $C_1$–$C_2$, preferably $C_1$, in the present invention. While the Lange compounds are described as useful as dyes for petroleum fuels or mineral oil, they do not function well as extractable markers as do the compounds of the present invention. The long-chain alkyl moieties of the esterifying acids in Lange provide good miscibility with non-polar petroleum fuels and mineral oil; in fact, such good miscibility that they are not easily extracted with acidic aqueous solutions.

Also, by virtue of the synthetic route followed in U.S. Pat. No. 3,534,016 to Lange, the compounds therein are not easily prepared in concentrated solutions. And perhaps more importantly, the synthetic route followed by Lange results in petroleum fuel-immiscible impurities which makes compounds prepared by the Lange route disadvantageous for petroleum fuel use because petroleum fuel must be extremely free of impurities.

While the synthetic route of the present invention involves coupling an esterified compound of formula (IV) above with a diazo compound, the synthetic rouge of Lange starts with a coupled dye having —OH functionality and esterifies this compound.

It is seen in Example 1 of Lange that 5.7 parts of an —OH functional dye is suspended in 50 parts of toluene. Thus, even at slightly more than a 10% level, the dye is insoluble in toluene. This aye is then reacted with the chloride of an acid having 9 carbon atoms. By this synthetic route, there are two significant sources of fuel-insoluble precipitates. Because the —OH functional dye is only suspended, not dissolved, in the toluene, unreacted dye inherently remains as insoluble fines.

Also, though synthesis of the dye is not described in Lange, the conventional method of producing such a dye would be to couple the —OH functional compound to a diazo compound, such as is described in U.S. Pat. No. 2,850,493 to Seruto. In such a synthesis, the azo compound is in acidic aqueous solution, and this acidic aqueous solution is added to the —OH functional compound in an alkaline aqueous solution such that coupling takes place at pH 10–12. While coupling take place at an alkaline pH, the change in environment from an acidic aqueous medium to an alkaline aqueous medium results in some decomposition of the diazo compound, resulting in precipitates which are insoluble in petroleum fuels.

In the present invention, a two-phase system is used, i.e., an acidic aqueous phase and a solvent phase. Because coupling is carried out in the presence of at an acidic aqueous solution, there is no decomposition occasioned by introducing a diazo compound to at an alkaline environment. Only solvent-soluble compounds, primarily the intended marker compound, migrate to the solvent phase which consequently carries only dissolved material. The solvent phase may carry upwards of 50 wt % marker, which marker is fully miscible with petroleum fuel.

The present invention will now be described in greater detail by way of specific examples.

EXAMPLE 1

Synthesis of acetate ester of phenyl-ethyl ethanolamine (A-PEEA)

To a 2 liter 4-neck reaction flask was charged 165 gm phenyl ethyl ethanolamine, 50 gm xylene, and 150 gm acetic anhydride. The mixture was heated to 125° C. and held for 16 hours. Reaction progress was followed by disappearance of phenyl-ethyl-ethanolamine via thin layer chromatography developed in 100% toluene (Silica Gel 60 with F254 indicator plates used and illuminated with a short wave U.V. light. The organic phase contains 100 gm non-volatile (92% conversion)in 50 gm xylene. (Optionally, the organic phase may be stripped of xylene to yield liquid (A-PEEA).

EXAMPLE 2

To a 3 liter reaction flask was charged 47.65 gm aniline, 200 gm ice and 1.2 moles (relative to PEEA) HCl. The aniline was diazotized with 35 gm solid sodium nitrate diluted to a 40% solution, diazotization being carried out in the range of −3° to 2° C. Once no excess nitrate was detected (with indicator), 100 gm A-PEEA in 50 gm of xylene (the solution obtained from Example 1) plus 50 gm of additional xylene were added. The reaction was continued until no more diazonium remained (as detected by β-Naphthol solution). The mixture was heated to 80° C. The organic phase was separated from the aqueous phase, and the organic phase was stripped, leaving a tarry orange liquid. Non-volatile weight of the compound was 178 gm.

EXAMPLE 3

Example 2 was repeated replacing the aniline with 63 gm of O-anisidine.

EXAMPLE 4

Example 2 was repeated replacing the aniline with 85 gm of 4-nitro-o-anisidine.

EXAMPLE 5

A petroleum fraction was tagged at a level of 5 ppm with the product of Example 4. 20 milliliters of this fuel was added to 10 ml. of concentrated HCl diluted 1:1 with water. The mixture was shaken and the lower aqueous layer developed a magenta color having at an absorbance maxima of 540 nanometers.

EXAMPLE 6

Dyes as in Examples 2–4 were synthesized, except that in the esterification step (as per Example 1), the anhydrides of propionic acid ($R^3$ is $C_2$) and isooctyl acid ($R^3$ is $C_7$). Tagging and extractions were carried out in the manner of Example 5 using a variety of acidic extractants including aqueous solutions of acetic, formic, propionic and phosphoric acids. In each case, the markers using acetic acid and propionic acids as the esterifying acids extracted readily. The markers using isooctyl acid as the esterifying acid extracted either to only a trace degree or up to about 20% of the amount of the acetic acid or propionic acid derivatives.

EXAMPLE 7

(Comparative)

Aniline was diazotized and coupled to phenylethylethanol amine to produce a solid, —OH functional dye by a conventional azo coupling technique very similar to that taught in U.S. Pat. No. 2,850,493. 5.7 parts of this dye was suspended in 50 gm of toluene and 150 gm of acetic anhydride. This mixture was brought to reflux and held there for sixteen hours. The organic layer was water washed to a neutral pH with 10% saline solution. The resultant esterified dye was vacuum stripped o toluene and diluted to a 60% non-volatile (active dye) solution in xylene. This marker solution gave at an insoluble level of 1.8% in K-1 kerosene. This compares to 0.2% insolubles in the marker prepared in Example 2. Commercial product specifies less than 0.5% insolubles.

What is claimed is:

1. A method of preparing a water-immiscible solvent solution of a compound having the formula

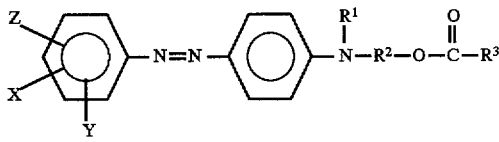

where $R^1$ is $C_1$–$C_3$-alkyl, $R^2$ is $C_1$–$C_3$-alkylene, and $R^3$ is $C_1$–$C_2$-alkyl, X and Y are the same or different and are selected from H, $C_1$–$C_3$-alkyl, $C_1$–$C_3$-alkoxy, halogen, and nitro, and Z is H or

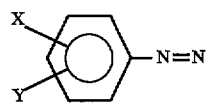

wherein X and Y are as defined above comprising diazotizing a compound having the formula

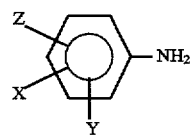

where X, Y and Z are as defined above, and coupling said diazotized compound with a compound having the formula

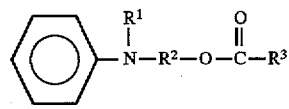

where $R^1$, $R^2$ and $R^3$ are as defined above, in a two-phase system including an acidic aqueous phase and a water-immiscible solvent phase.

2. A method according to claim 1 wherein $R^3$ is methyl.

3. A petroleum fuel tagged with a compound having the formula

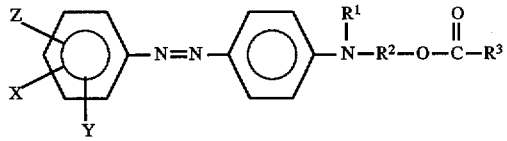

where $R^1$ is $C_1$–$C_3$-alkyl, $R^2$ is $C_1$–$C_3$-alkylene, and $R^3$ is $C_1$–$C_2$-alkyl, X and Y are the same or different and are selected from H, $C_1$–$C_3$-alkyl, $C_1$–$C_3$-alkoxy, halogen, and nitro, and Z is H or

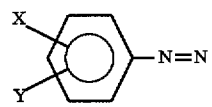

wherein X and Y are as defined above.

4. A tagged petroleum fuel according to claim 3 wherein $R^3$ is methyl.

5. A method of tagging a petroleum fuel and subsequently identifying the tagged petroleum fuel, the method comprising, providing a solution of a compound of the formula

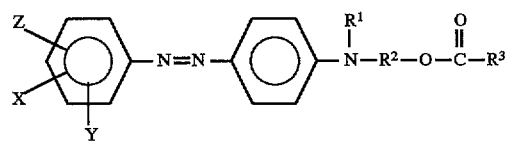

where $R^1$ is $C_1$–$C_3$-alkyl, $R^2$ is $C_1$–$C_3$-alkylene, and $R^3$ is $C_1$–$C_2$-alkyl, X and Y are the same or different and are selected from H, $C_1$–$C_3$-alkyl, $C_1$–$C_3$-alkoxy, halogen, and nitro, and Z is H or

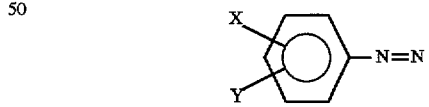

wherein X and Y are as defined above, said compound being dissolved in a water-immiscible organic solvent to provide a marker solution, tagging said petroleum fuel with said marker solution, and subsequently extracting said compound from said petroleum fuel with an acidic aqueous solution, thereby producing a chromophoric reaction of said compound.

6. A method according to claim 5 where $R^3$ is methyl.

* * * * *